Figure 1:
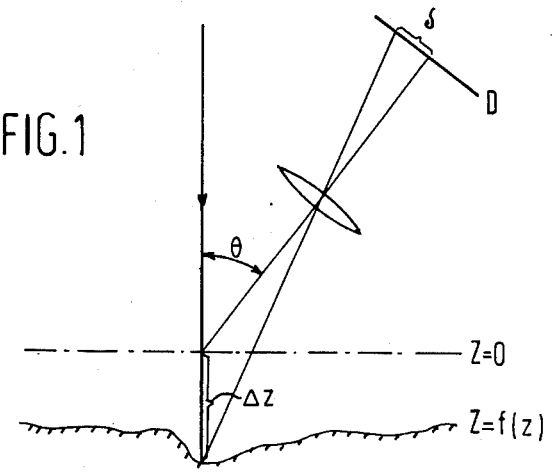

United States Patent [19]

Beckmann et al.

[11] Patent Number: 4,701,049
[45] Date of Patent: Oct. 20, 1987

[54] MEASURING SYSTEM EMPLOYING A MEASURING METHOD BASED ON THE TRIANGULATION PRINCIPLE FOR THE NON-CONTACT MEASUREMENT OF A DISTANCE FROM THE SURFACE OF A CONTOURED OBJECT TO A REFERENCE LEVEL.

[75] Inventors: Leo H.J.F. Beckmann, Delft; Gysbert L. Oomea, Pijnacker, both of Netherlands

[73] Assignee: B.V. Optische Industrie "De Oude Delft", Netherlands

[21] Appl. No.: 622,546

[22] Filed: Jun. 19, 1984

[30] Foreign Application Priority Data

Jun. 22, 1983 [NL] Netherlands .................. 8302228

[51] Int. Cl.$^4$ ............................................. G01C 3/08
[52] U.S. Cl. .......................................... 356/1; 356/4
[58] Field of Search ............... 356/1, 4; 250/568, 569, 250/204

[56] References Cited

U.S. PATENT DOCUMENTS 4,529,316  7/1985  Di Matteo ..................... 356/1

FOREIGN PATENT DOCUMENTS 211008  12/1982  Japan ............................ 356/1

Primary Examiner—Gene Wan
Attorney, Agent, or Firm—Marn, Louis E.

[57] ABSTRACT

An apparatus for dimensional inspection of an object. The apparatus is adapted to produce a slender beam of measuring radiation for irradiating an object under examination. Reflected light image receiving means are provided including a receiving lens for collecting radiation reflected from an object surface spot irradiated by the measuring beam, and a linear photo-sensitive detector. The receiving lens is dimensioned and disposed relative to the measuring beam and the linear detector as to exclusively project those object surface spots irradiated by a longitudinal section defining a measuring range, of the measuring beam, as focussed dots on the linear photo-sensitive detector area. For improving the resolution of the focussed dots produced on the detector, a beam forming lens is provided for causing the cross-sectional area of the measuring beam to gradually increase over the measuring range. The apparatus is further adapted to image one and same object surface spot irradiated by the measuring means as two separate dots on the detector wherein these dots are uniquely related to each other only, in case a true reflection has been received. Thereby a discrimination can be made between true and false reflections from the object under examination.

8 Claims, 8 Drawing Figures

MEASURING SYSTEM EMPLOYING A MEASURING METHOD BASED ON THE TRIANGULATION PRINCIPLE FOR THE NON-CONTACT MEASUREMENT OF A DISTANCE FROM THE SURFACE OF A CONTOURED OBJECT TO A REFERENCE LEVEL.

The invention relates to a measuring system employing a measuring method based on the triangulation principle for the non-contact measurement of a distance from the surface of a contoured object to a reference level, which system comprises: a transmission section including a source for emitting measuring radiation and means for guiding the measuring radiation so that a beam of measuring radiation is formed, which measuring radiation guide means define a transmission path along which the beam of measuring radiation is projected onto the object's surface under inspection; and a reception section including means for guiding reflected radiation and a detector sensitive to reflected radiation and operative to convert reflected radiation received thereby into a corresponding signal of a different type, which reflected radiation guide means form reflected radiation originating from a radiation spot caused by the projection 2of the beam of measuring radiation onto the object's surface into a beam of reflected radiation and define a reception path along which the beam of reflected radiation is projected onto the radiation-sensitive detector.

A measuring system of the above type is known from, for example, DE-OS No. 3,122,712 A1. This publication further describes the general principle of triangulation used as a basis for the non-contact measurement of the distance between a given point of a surface contour of an object's surface under inspection and a reference plane. FIG. 1 is illustrative of this principle. The beam of measuring radiation is projected onto a given point of an object's surface under inspection, which surface has been schematically indicated by hatching.

The distance $\Delta z$ to be measured between this point of the surface contour and a reference plane indicated by $Z=0$ is then given by the equation $\delta = \Delta z \cdot M \cdot \sin\theta$, where $\theta$ is the viewing angle at which a radiation spot projected onto the reference plane is viewed from a detector D sensitive to reflected radiation; M is the measure of optical magnification; and $\delta$ is the distance between the projection of the reference level on the detector and the projection of the respective point of the object's surface on this detector.

The object of the proposals disclosed in the aforesaid publication is to increase the measuring rate by employing a so-called wavelength marking technique, without variations in the reflectivity of an object's surface under inspection introducing errors into the result of the measurement and without the results being ambiguous. To this end, use is made of a beam of measuring radiation of at least two different wavelengths; a raster pattern characterized by these wavelengths is projected onto the object's surface under inspection and the reflected radiation originating from this pattern is passed through separate wavelength-sensitive receiving channels to discrete detectors responsive to the respective wavelengths. This prior art technique entails the following drawbacks: the measurements are highly responsive to background radiation, which results in an adverse signal-to-noise ratio in respect of the output signal derived from the detectors; it is necessary to use at least two separate detector units each having a sensitivity matching one of the different wavelengths selected for the measurement; and the measurements are responsive to changes in colour of the object's surface under inspection.

The DE-OS No. 3,110,644 A1 likewise describes the general principle of triangulation as a basis for the non-contact measurement of the distance between a reference plane and a given point of an object's surface. The object contemplated by the proposals disclosed in this publication is to provide a solution to the problem arising when the optical axis of the beam of measuring radiation is shifted as a result of drift, causing the point where this beam impinges upon the object's surface to be shifted too. Such a shift results in the introduction of measuring errors as in this prior art technique the only measuring information available is the distance between a first spot projected on the detector as corresponding to the zero or reference level and a second spot projected on this detector as corresponding to the point of the object's surface under inspection. The crux of the technique disclosed in this publication resides in the derivation of an error signal representative of the magnitude of the shift experienced by the optical axis of the beam of measuring radiation, which error signal is used for the correction of the measuring signal derived from the detector. However, this prior publication fails to disclose measures resulting in an adequate elimination of the effect of false reflections on the result of the measurement.

The Selcom firm has developed a measuring system for the non-contact measurement of data relating to an object's surface. This known measuring system is likewise based on the triangulation principle. Moreover, this measuring system likewise entails the drawback of being highly responsive to background radiation, which results in an adverse signal-to-noise ratio for the detector output signal. An additional drawback is the relatively poor lateral resolution, i.e. the resolution in planes normal to the beam of measuring radiation.

It is an object of the invention to eliminate the above-mentioned drawbacks. In particular, it is an object of the invention to provide a measuring system of the type described above, in which the adverse effect of background radiation on the results of the measurement can be considerably reduced, so that the signal-to-noise ratio of the detector output signal is enhanced accordingly.

A measuring system according to the invention is based on the idea of substantially restricting the sensitivity to radiation of the reception section to a spatial volume having the form of an optimally slim beam extending substantially normal to an object's surface under inspection.

A basic embodiment of the measuring system according to the invention is characterized in that the detector is sensitive to radiation only in a substantially linear area; and that only elements of the object's surface which are directly illuminated by the beam of measuring radiation, at any rate a longitudinal section thereof constituting the measuring zone, are imaged as corresponding, focussed spots on the linear radiation-sensitive area of the detector. In this manner, consequently, a thus-illuminated point of the object's surface is imaged as a sharply defined point on this area of the detector.

In such a measuring system, in principle any radiation originating from a region of the object's surface located outside the beam of measuring radiation will not result in the detector producing an, in that case spurious, output signal. In fact, when radiation originates from a region of the object's surface located substantially within the "plan" defined by the substantially linear beam of measuring radiation and the substantially linear radiation-sensitive area of the detector though outside this beam of measuring radiation, this radiation will be imaged on the detector or an imaginary plane containing this detector as an out-of-focus spot, which does not result in the production of a significant signal at the detector output. The spot will be more out of focus as the region from which the radiation originates is farther away from the beam of measuring radiation. Furthermore, when radiation originates from a region of the object's surface located outside the aforesaid "plan", the resultant spot will be imaged, either in or out of focus, on the aforesaid imaginary detector plane though outside the linear radiation-sensitive detector area, so that such a spot does not result either in the production of a spurious detector output signal.

An enhanced version of the above basic embodiment of the measuring system according to the invention is characterized in that a focussing lens included in the measuring radiation guide means is operative to so focus the beam of measuring radiation that, in the measuring zone, the cross-sectional area of this beam varies as a function of the distance as seen in the direction of the beam, so that all object spots formed within the measuring zone are imaged on the radiation-sensitive detector as spots of substantially equal size. In particular, the power and the position of the focussing lens are such that the size of each object spot formed by the beam of measuring radiation within the measuring zone increases as the respective object spot is farther remote from the focussing lens. In this manner, the essentially linear variation of the measure of reduction introduced by the objective lens system of the detector, i.e. the extent to which an object spot is reduced when imaged on the detector, is compensated for. This means that with a given position of the beam of measuring radiation, a succession of object spots defined thereby is imaged on the detector as a succession of focussed spots of substantially equal size. The measure of reduction introduced by the detector objective lens system is preferably selected so that the size of a detector spot corresponding to an object spot is substantially equal to the area of a few detector elements In this manner, the image definition and the lateral resolution are optimized throughout the entire measuring zone. Furthermore, as radiation originating from a surface region located outside the beam of measuring radiation will not cause a significant detector output signal, as explained above, a highly satisfactory signal-to-noise ratio is achieved.

A measuring system according to the invention is especially suited for use in situations involving the presence of substantial sources of background radiation, such as high-intensity light sources. An example of such a situation is the use of the measuring system in an automated welding process, in which case the measuring system should be immune to the high-intensity light radiation caused by the welding arc. In a measuring system to be used to advantage in such situations, use is preferably made of a radiation source, such as a laser, emitting monochromatic radiation. In accordance with the invention, the wavelength of this radiation is selected to be in a portion of the spectrum where the presence of wavelength components of spurious background radiation to be expected, is small; while an optical bandpass filter is mounted within the spatial viewing angle of the detector, a wavelength of the passband, preferably a medium wavelength thereof, corresponding to the wavelength of the monochromatic radiation. In practice, a He-Ne laser appears to provide good results.

The invention can further be used to advantage when one or more surface contours or surface profiles of an object's surface under inspection are to be measured. In accordance with the invention, a measuring system suiting this purpose is characterized in that the measuring radiation guide means are coupled to a drive means operative to have the beam of measuring radiation performascanning movement in a plane of measurement; and that the reflected radiation guide means are adapted to image object spots illuminated by the beam of measuring radiation during a scanning movement on a substantially linear radiation-sensitive area of the detector as focussed spots moving isochronally with the illuminated object spots.

A further object of the invention is to provide a measuring system of the type described above, in which the adverse effect of false reflections can be eliminated by means of a simple structure. In general, false reflections are formed by reflected radiation imaged on the respective detector as a result of the beam of measuring radiation incident on a given point of the object's surface being reflected to the detector by other surface elements located within or just outside the volume of the beam of measuring radiation.

In accordance with the invention, an embodiment of a measuring system suited to achieve the aforesaid object is characterized in that the reflected radiation guide means define, in addition to the first-named reception path, a second reception path forming with the first reception path a mirror-symmetrical configuration relative to a plane containing the beam of measuring radiation, this second reception path projecting reflected radiation originating from the respective object spot and guided along this path onto a second, separate radiation-sensitive detector; and that the outputs of the two radiation-sensitive detectors are coupled to a comparator for so comparing the output signals produced by these detectors that reflected radiation resulting from singular reflection of the beam of measuring radiation from the object's surface provides a useful output signal.

By correlating the two signals produced at the outputs of the separate detectors with each other, for example by multiplication, it is pessible to distinguish a spot projected onto the detectors by a false reflection from a spot projected onto the detector by a "good" reflection.

An improved embodiment of a measuring system according to the invention is characterized in that the reflected radiation guide means define a second reception path in addition to the first-named reception path, an initial portion of this second reception path as extending from a respective object spot forming with a corresponding initial portion of the first reception path a mirror-symmetrical configuration relative to a plane containing the beam of measuring radiation, this second reception path likewise projecting reflected radiation originating from the respective object spot and guided along this path onto the aforesaid radiation-sensitive detector; and that the output of this detector is coupled to a signal processing means operative to so process the detector output signals that a useful signal is provided in response to reflected radiation resulting from singular reflection of the beam of measuring radiation from the object's surface.

In such an embodiment, the use of a single detector suffices, which saves considerable cost and results in an arrangement of simpler structure.

In accordance with the invention, a preferred embodiment of such a measuring system is characterized in that a portion of the second reception path is oriented to so deviate from a corresponding portion of the first reception path that reflected radiation originating from one and the same object spot as defined by the intersection of the plane containing the beam of measuring radiation and the respective object's surface is imaged on the detector via one reception path as a detector spot spaced a fixed distance from the detector spot imaged on the detector via the other reception path as a projection of that object spot; and that the signal processing means are arranged to perform an auto-correlating function in respect of the detector output signal containing two discrete signal components spaced apart an interval corresponding to the aforesaid fixed distance.

In accordance with the invention, a first realization of such a measuring system is characterized in that the reflected radiation guide means include two prisms secured to each other to have one prism face in common, so that reflected radiation traversing one reception path is passed by this common prism face in partially undiffracted fashion into the direction of the detector and reflected radiation traversing the other reception path is partially reflected into the direction of this detector.

In accordance with the invention, a second realization of such a measuring system is characterized in that the aforesaid common prism face is tilted relative to the plane containing the beam of measuring radiation, the tilting angle being determinative of the aforesaid fixed distance.

For additional protection against false reflections, if any, satisfying the discrimination criterion established by the embodiments described above, a measuring system according to the invention is further characterized in that both reception paths include a reflector surface operative to direct reflected radiation originating from the object's surface onto the aforesaid common prism face; that each of these reflector surfaces is tilted through one and the same angle about a respective one of two intersecting axes extending mirror-symmetrically relative to the plane containing the beam of measuring radiation; and that the beam of measuring radiation is directed along the line of intersection of two planes via which this beam is imaged on the detector along the first and the second reception path.

In accordance with the invention, a structurally simple embodiment of a measuring system is characterized in that both reception paths include a reflector surface operative to direct reflected radiation originating from the object's surface onto the aforesaid prism face, and that each of these reflector surfaces forms together with the common prism face one of the two prisms.

An alternative embodiment of a measuring system according to the invention is characterized in that the reflected radiation guide means define a second reception path in addition to the first-named reception path, an initial portion of the second reception path as extending from a respective object spot forming with a corresponding initial portion of the first reception path a mirror-symmetrical configuration relative to a plane containing the beam of measuring radiation, both initial portions of this mirror-symmetrical configuration including a periodically active light radiation switch causing the respective optical path to successively be in blocked and transmissive state, so that reflected radiation is presented to the radiation-sensitive detector alternately via the one and the other reception path in accordance with a succession of time slots defining a first and a second time channel; and that the output of this detector is coupled to a signal processing means including a demodulator operative to convert the time-divided signals of the first time channel and of the second time channel into two spatially separated signals, and a comparator operative to so compare these two spatially separated signals with each other that reflected radiation resulting from singular reflection of the beam of measuring radiation from the object's surface provides a useful output signal.

In accordance with the invention, an additional criterion for distinguishing between "good" and "false" reflections can be obtained by introducing a predetermined characteristic into the beam of measuring radiation. By means of, for example, a planoparallel plate it is possible to give the beam of measuring radiation an asymmetric intensity distribution. In accordance with the invention, an embodiment based on this principle is characterized in that the transmission section includes beam-distorting means for irradiating a respective object's surface with a measuring beam of asymmetric intensity distribution; and that the reception section includes a signal processor operative to only pass those signal portions of a detector output signal applied thereto that correspond to image spots being a projection on the detector of the object spot located in the plane of the measuring beam that has an asymmetric intensity distribution as determined by the measuring beam. In this embodiment, use is made of the fact that "good" reflections provide an asymmetric waveform in the detector output signal, which waveform is the mirror image of a waveform provided in this detector output signal by a "false" reflection, such a "false" reflection actually signifying that the measuring beam has been reflected twice from the object's surface.

Figure 4:
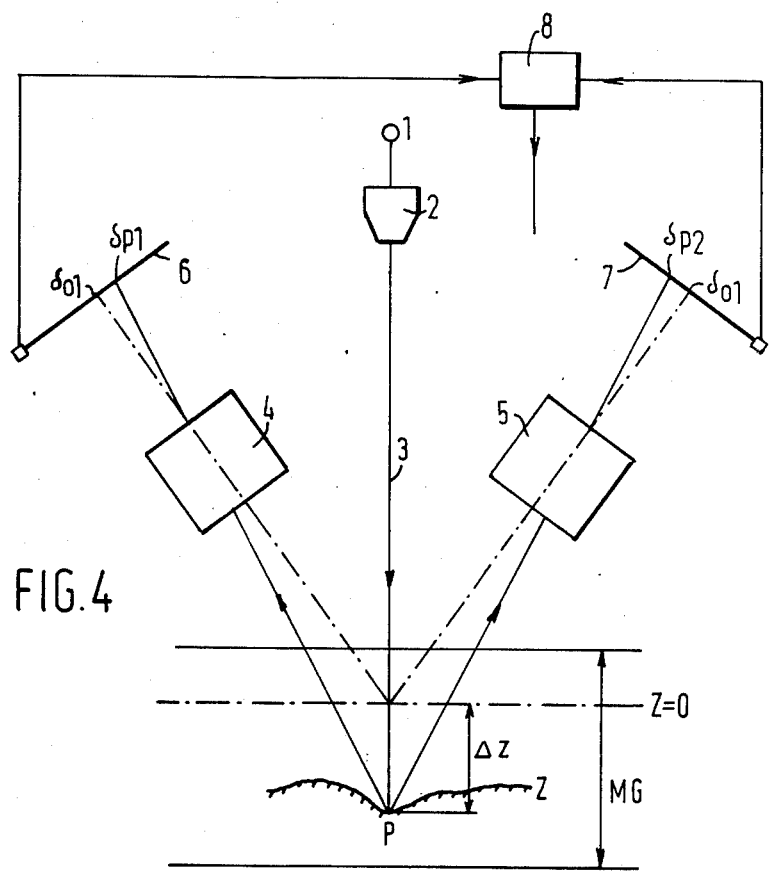
Figure 2A:
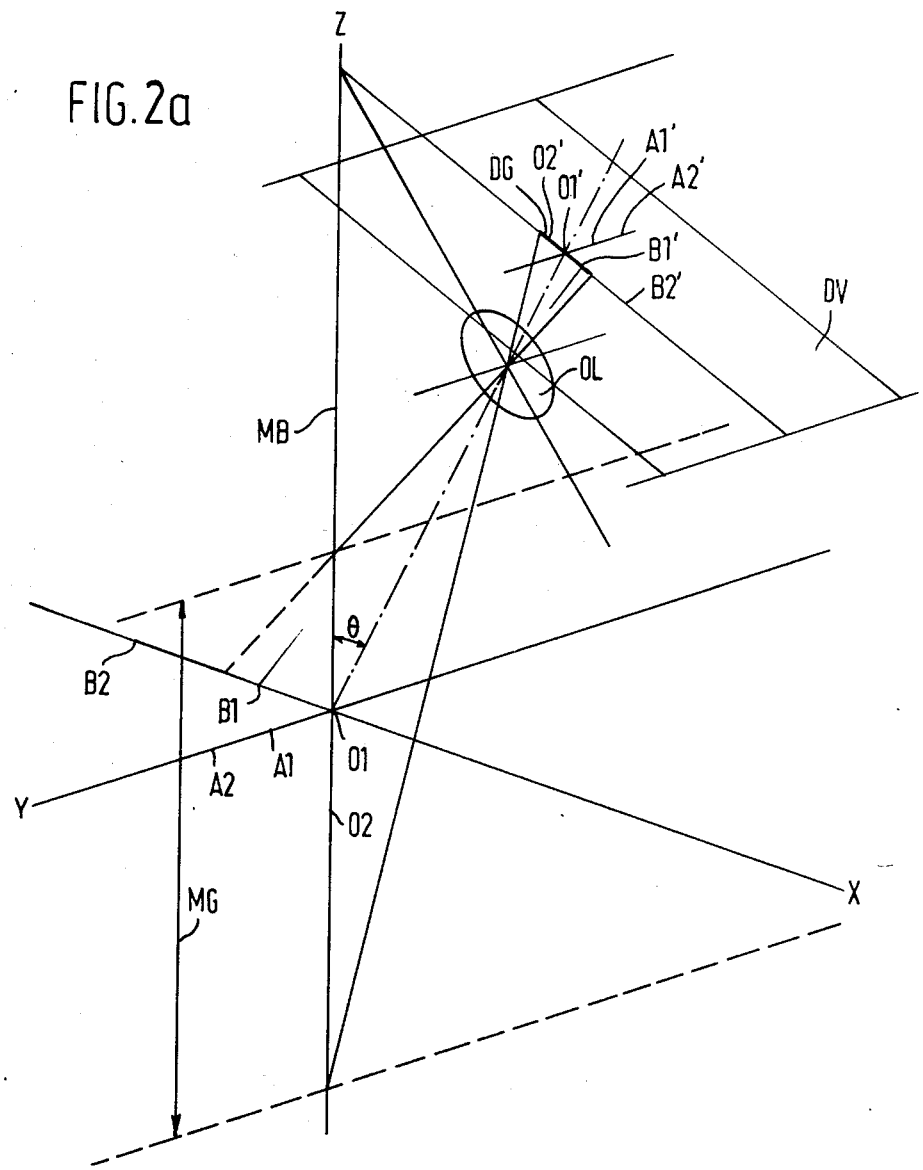
Figure 2B:
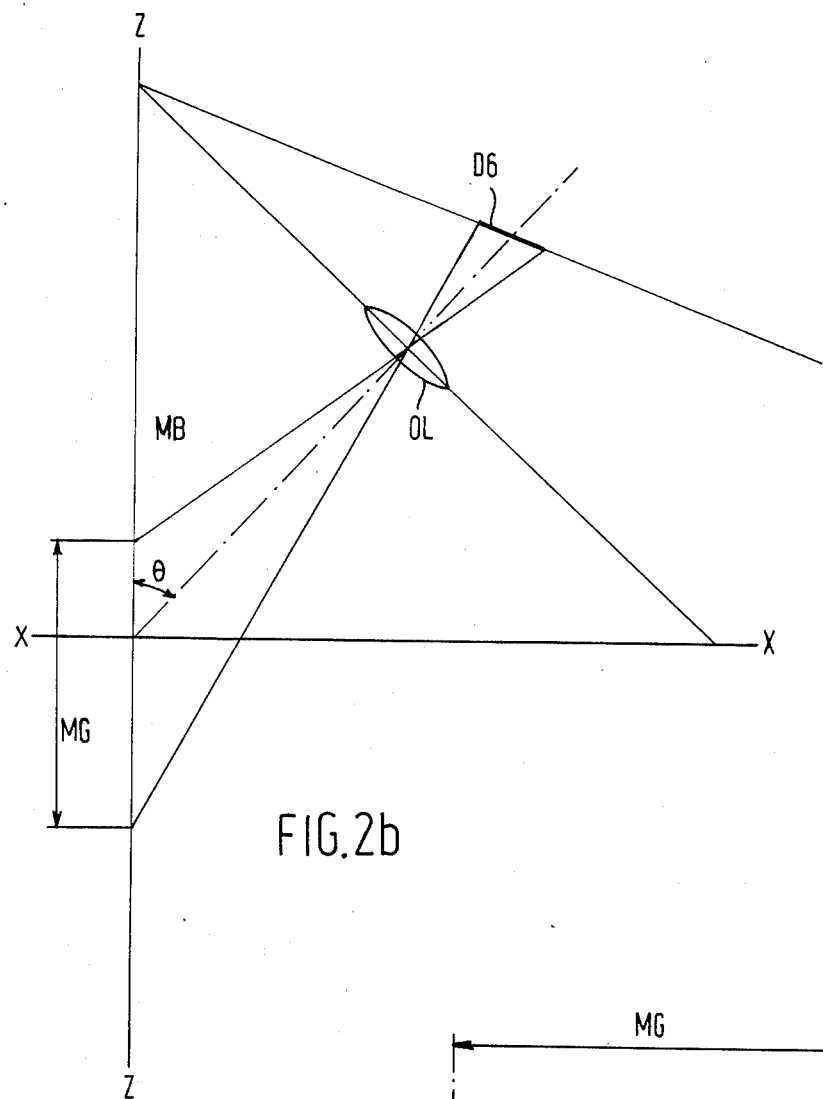
Figure 3:
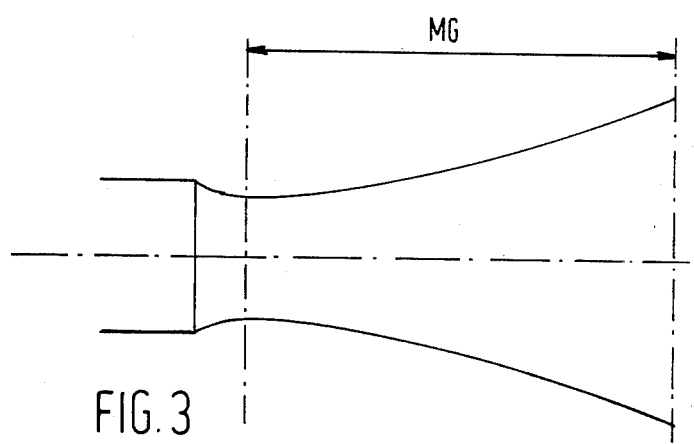
Figure 6:
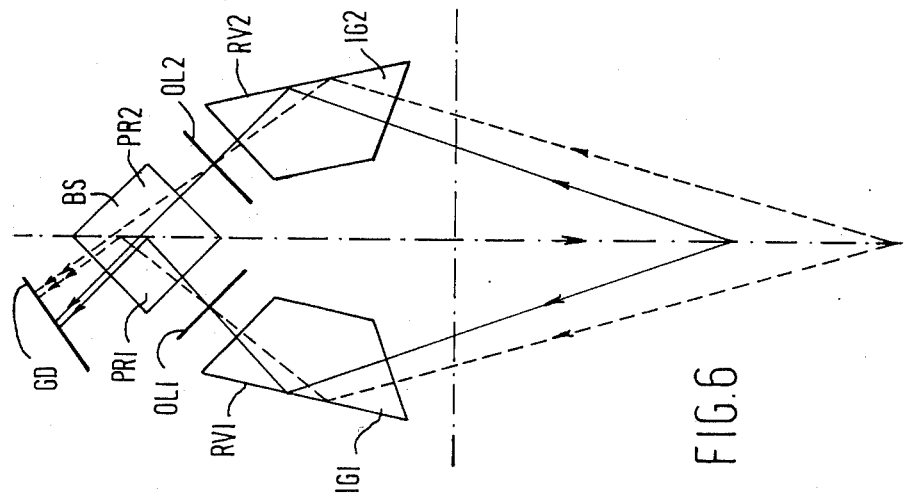
Figure 5:
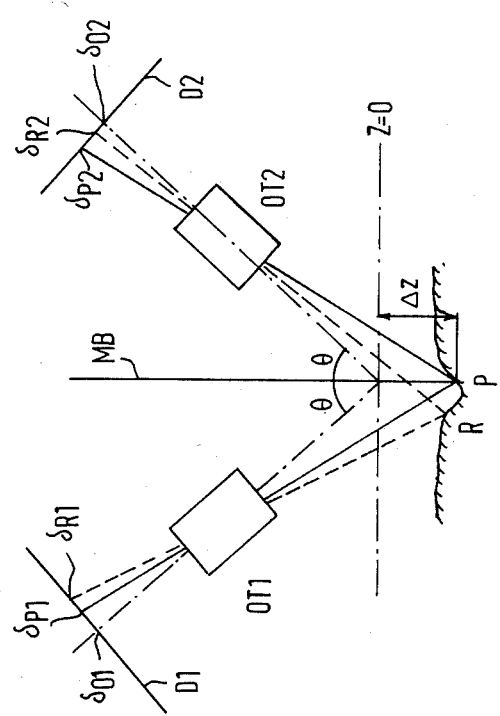
Figure 7:
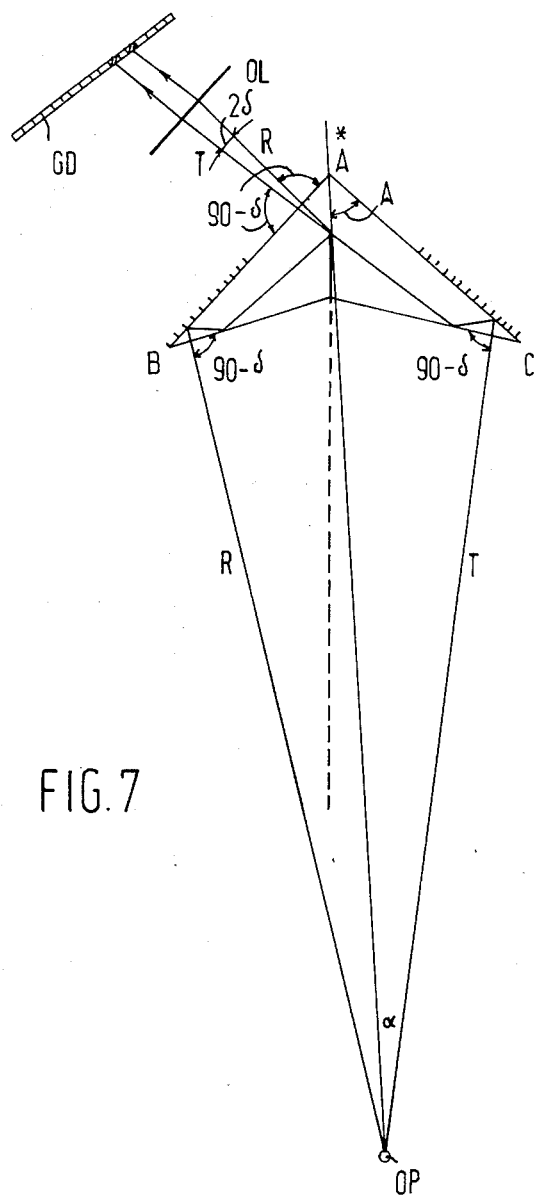

In illustration of the invention, a number of embodiments thereof will now be described in greater detail with reference to the accompanying drawings. Self-evidently, the invention is not restricted to the embodiments described. In the drawings:

FIG. 1 schematically illustrates the use of the principle of triangulation for the measurement of a distance between a point of an object's surface and a reference level;

FIGS. 2a and 2b schematically show an embodiment of a measuring system according to the invention in which the response to background radiation has been greatly reduced;

FIG. 3 schematically shows a longitudinal cross-section of the measuring zone of a focussed beam of measuring radiation, the shape shown being particularly suited for forming a substantially uniform projection of object spots on the detector;

FIG. 4 schematically shows an embodiment of a measuring system according to the invention employing two separate optical channels for the measurement;

FIG. 5 schematically shows the manner in which false reflections can be eliminated in accordance with the invention by means of an embodiment as shown in FIG. 4;

FIG. 6 schematically shows a simplified embodiment of a measuring system according to the invention; and FIG. 7 schematically shows a variant of the embodiment shown in FIG. 6.

FIG. 2a schematically shows a basic embodiment of a measuring system according to the invention, which embodiment is characterized by the fact that the detector is irresponsive to spurious background radiation and only radiation originating from an object spot illuminated by the beam of measuring radiation is imaged in optimally focussed fashion on a linear radiation-sensitive area of the detector. In FIG. 2a, the measuring beam MB is schematically shown as a straight line extending in the Z direction. The measuring zone MG is a zone bounded in the YZ plane in which the "depth" of surface regions of an object can be measured when "illuminated" by the measuring beam. By way of example, FIG. 2a shows two of such object spots 01 and 02 produced when illuminating two surface elements of the object at different "depths" by means of a measuring beam incident along the Z axis. In a measuring system according to the invention, only object spots such as 01 and 02, i.e. object spots defined as surface regions directly illuminated by the measuring beam, are imaged via a schematically shown objective lens system OL on a detector surface DV as focussed spots 01' and 02'. This implies that, in principle, all of such object spots located within the measuring zone, which are defined as surface regions that can be illuminated by the measuring beam, are imaged on the detector surface DV in a substantially linear area schematically indicated by DG. In accordance with an aspect of the present invention, the detector comprises a substantially linear configuration of detector elements, a substantially linear radiation-sensitive area of detector elements being used for preference. In a detector restricted to such a substantially linear radiation-sensitive area, all radiation originating from a surface region located (a) within the "plane" defined by the substantially linear measuring beam and the linear radiation-sensitive detector area, and (b) outside the measuring beam, will be imaged on this radiation-sensitive detector area or on the extension thereof. The objective lens system OL is so constructed that such radiation, in sofar as originating from surface elements located within the viewing angle defined by the length of the radiation-sensitive detector area and the lens aperture though outside the measuring beam, is imaged on the radiation-sensitive detector area DG as out-of-focus spots, e.g. B1 is imaged as B1', whereas radiation originating from places located in the aforesaid "plane" though outside the aforesaid viewing angle is projected onto the extension of and outside the radiation-sensitive area, such as e.g. B2 as B2'. In neither of these instances, the detector will produce an output signal which, if produced indeed, should be regarded as a spurious signal. This will also apply to radiation originating from surface regions located outside the aforesaid "plane". For example, the surface region A1 or A2 located outside the aforesaid plane, i.e. the XZ plane in FIG. 2a, will be projected via the objective lens system OL as in-focus or out-of-focus spot A1' or A2', consequently outside and aside of the radiation-sensitive detector area DG. All surface regions located outside the aforesaid XZ plane, such as A1, will always be projected outside and aside of the radiation-sensitive detector area DG and be imaged on the plane DV, either in or out of focus as depending upon the spatial position. As a result, the actual detector DG will be irresponsive to such sources of spurious radiation.

As the surface regions illuminated by the measuring beam are viewed from the detector at different angles, such as $\theta$, in dependence upon the "depth" in the Z direction to be measured, and the measure of imaging, i.e. the extent to which an object spot illuminated by the measuring beam is reduced when imaged on the detector, likewise varies as a function of the Z coordinate over the measuring zone MG, the detector plane DG and hence the actual detector DG is mounted at a given angle relative to the optical axis 01-P thereof.

For the sake of clarity, this is shown in greater detail in FIG. 2b illustrating the situation obtaining in the XZ plane of FIG. 2a. By such an arrangement, it is achieved that the focussing effect of the objective lens system OL on all object spots resulting from illumination by the measuring beam will be substantially uniform, so that irrespective of their position in the Z direction such object spots are imaged on the linear radiation-sensitive detector area in equally, in fact highly, focussed fashion.

In a measuring system according to the invention, it is further contemplated to optimize the lateral resolution throughout the measuring zone, i.e. the resolution in planes transverse to the measuring beam, to the effect that irrespective of the position at which an object spot is located within the measuring beam, this object spot is imaged on the detector as an image spot having a cross-sectional area corresponding to that of a few, e.g. two to four, detector cells (a detector cell has dimensions of e.g. $25 \times 26$ $\mu$m). By means of an appropriately dimensioned focussing lens mounted in the optical path of the measuring beam it is possible to achieve a satisfactory compromise between the two requirements of, on the first hand, an optimally slim measuring beam and, on the other hand, a substantially uniform projection of the object spots on the detector. By way of example, FIG. 3 shows a satisfactory shape of the measuring beam in longitudinal section. As appears from FIG. 3, the measuring beam will be essentially divergent in the direction of radiation. In a measuring system according to the invention it is thus achieved that the substantially linear variation of the measure of imaging as a function of the distance between the focussing lens for the measuring beam and a respective object spot caused by the illumination of a surface element by this measuring beam, which distance varies in the Z direction, is compensated for by the variation in the size of the object spot as a function of this distance as achieved as a result of the particular beam shape chosen. Consequently, the choice of the particular shape of the measuring beam results in the size of the object spot being increased in proportion as the measure of magnification is decreased as a function of the distance in the Z direction. In this manner, surface elements illuminated by the measuring beam throughout the entire measuring zone thereof can be imaged on the radiation-sensitive detector area as spots of substantially equal size.

The above concerned the performance of a $\Delta z$ measurement by means of a measuring beam having only a single position, thus permitting only the depth of surface elements illuminated by this beam to be measured. However, it is often desired to perform such measurements for different positions of the measuring beam so as to allow the measurement of surface profiles or surface contours of an object. Furthermore, it is then often desired to perform measurements to a large number of different surface elements within a brief period of time, for example more than 1000 measurements per second. In accordance with a further aspect of the invention, the transmission section of the measuring system is arranged to realize movement of the measuring beam over the object's surface, preferably in accordance with a succession of sweeping movements in mutually parallel planes, for example planes parallel to the YZ plane of FIG. 2a. To this end, after a sweep the measuring beam is so shifted in, for example, the X direction of FIG. 2a that a next sweep is performed in a plane parallel to the plane of the previous sweep, etc. In this manner, an object's surface can be systematically scanned, for example at a measuring rate of 115 $\Delta z$ measurements per sweep and a scanning rate of 10 sweeps per second. The reception section of the measuring system is so arranged that the reflected radiation guide means are operative to image the surface elements successively illuminated during a sweeping movement of the measuring beam on the radiation-sensitive detector area as spots isochronously moving and corresponding with these elements. In other words, at each angular position of the measuring beam during a sweep the illuminated object spot is sharply imaged on the radiation-sensitive detector area as a corresponding, well-defined spot.

In an embodiment suiting the above purposes, the desired sweeping movement of the measuring beam is achieved by means of a measuring beam mirror mounted for pivotal movement about a shaft, the measuring beam produced by a fixedly mounted focussing lens and radiation source being directed onto this mirror. The shaft is coupled to a drive mechanism arranged for imparting a reciprocatory sweeping movement through a desired sweep angle to this shaft and hence the measuring beam mirror. In this manner, the measuring beam can be swept through a desired angular distance, for example in the YZ plane in the arrangement of FIG. 2a. A preferred embodiment additionally includes a mirror for receiving reflected radiation, which receiving mirror is likewise mounted for pivotal movement about the aforesaid shaft and is so mounted thereon relative to the measuring beam mirror that, when the drive mechanism is operative the measuring beam mirror and the receiving mirror perform isochronous, reciprocatory sweeping movements. In this manner, the surface elements illuminated by the measuring beam mirror are viewed by the receiving mirror, and the reflected radiation originating from these surface elements is passed via this receiving mirror and via a fixedly mounted objective lens to the likewise fixedly mounted detector. The arrangement further includes a measuring beam position sensor producing position signals representative of the instantaneous measuring beam position. Data necessary for the measurement of the surface profile are derived from such position signals. In this preferred embodiment, the object spots illuminated by the measuring beam during the sweeping movement are isochronously followed by the reception section, so that spots corresponding to the respective object spots are imaged on the detector. In this manner, at any point of time during the scanning procedure it is known from which spatial volume area a response is to be expected, it being ensured that the reception section is substantially only responsive to reflected radiation originating from the spatial volume bounded by the measuring beam. In other words, sources of spurious radiation located outside this volume area have practically no effect on the measurement. This implies that the measuring system will have a highly satisfactory signal-to-noise ratio.

It is not necessary to have one or more components of the reception section move along with the measuring beam during a scanning procedure, as this is the case with the receiving mirror of the embodiment described above. In principle, the same result can be achieved by using a reception section fixedly mounted in space and lacking moving components. In order to achieve a proper signal-to-noise ratio, however, it is then necessary to employ a two-dimensional detector with an associated control means operative to move a linear radiation-sensitive detector area in isochronism with the measuring beam in this two-dimensional detector plane.

If the measuring system is to be used in the vicinity of substantial sources of spurious radiation, for example when the measuring system according to the invention is employed in an automated welding process, additional steps may advantageously be taken to eliminate the effect of such spurious radiation on the detector. In accordance with a further aspect of the invention, use is made of the fact that the spectrum of spurious light radiation will exhibit "valley zones" and that sources of monochromatic radiation are available emitting radiation of a wavelength corresponding to such a zone. In accordance with the invention, a He-Ne laser is used as a source of monochromatic radiation, an optical bandpass filter, for example an interference filter, being mounted within the spatial viewing angle of the detector. The passband of this filter includes the wavelength corresponding to that of the radiation emitted by the laser. The effect of spurious radiation can efficiently be eliminated in this manner.

In the embodiments discussed above, the reflected radiation is passed to the detector via a single optical transmission path. This renders it possible that so-called false reflections, which are caused by the measuring beam being reflected more than one time from the object's surface into the direction of the detector, have an adverse effect on the result of the measurement. It is therefore recommended to modify the above-described embodiments so, that the effect of such false reflections can be efficiently eliminated. The following discusses a number of examples of embodiments suiting such a purpose.

The embodiment of a measuring system according to the invention as schematically shown in FIG. 4 comprises a source 1 for producing measuring radiation. Although the invention is not restricted thereto, by preference use is made of optical radiation, particularly radiation produced by a laser. For the sake of simplicity, in the following the use of optical radiation is presumed. Via an optical system 2 including a focussing lens and light guide means, the measuring radiation, i.e. light radiation, emitted by the source 1 is directed and projected onto an object's surface Z under inspection in the form of a measuring beam 3. In FIG. 4, a portion of object's surface Z is schematically indicated by hatching. Furthermore, the dashed line Z=0 represents the reference level relative to which the respective distance $\Delta z$ is to be measured, while MG represents the extent of the measuring zone. The measuring beam produces a light spot at point P of the object's surface. The measuring system further includes a first reflected light transmission channel 4 and a second reflected light transmission channel 5. Each of these reflected light transmission channels is optically coupled to the receiving end of an associated lightsensitive detector 6 and 7, respectively, capable of converting received reflected light into a corresponding signal of different form, preferably an electrical signal. The two transmission channels are identical and define a light path configuration that is mirror-symmetrical relative to an imaginary "measuring beam plane" containing the measuring beam and extending normal to the plane of the drawing. Thus it is achieved that a measuring light spot whose place P is defined by the intersection of the measuring beam plane and the object's surface is imaged on the two detectors 6 and 7 as detector spots $\delta_{P1}$ and $\delta_{P2}$, respectively, spaced equal distances from detector spot positions $\delta_{01}$ and $\delta_{02}$, respectively. The outputs of detectors 6 and 7, respectively, are connected to the first and second input, respectively, of a comparator 8. By way of example, it is assumed that each one of detectors 6 and 7 is a charge-coupled device (CCD) having a given number of detector cells. During the measuring procedure, i.e. the measurement of distance $\Delta z$, the contents of these two CCDs are serially shifted out, so that a time function signal is produced at the output of the respective detector, in which signal the light spot position, such as $\delta_{P1}$ or $\delta_{P2}$, is represented as a time interval. The comparator is operative to multiply the synchronized detector signals applied thereto by each other. This implies that an object light spot located in the measuring beam plane, i.e. the plane of symmetry, will cause the production of a significant output signal at the output of the comparator. In a measuring system arranged in the above manner, it is actually ensured that practically only object light spots located in the measuring beam plane (the plane of symmetry) are imaged on the two detectors as mutually correlated image spots whose positions on the respective detector surfaces provide information as to the distance $\Delta z$ to be measured. When each of these detectors is read out, time function signals are derived from such position function signals at the respective detector outputs. The two time function signals developed at the outputs of the two detectors will likewise be correlated. This means that a multiplication of the two detector output signals as performed by the comparator will result in a product signal having a waveform from which a conclusion can be drawn as to whether the respective $\Delta z$ measurement is "good", in other words whether the result of the measurement is related to an object light spot located in the aforesaid plane of symmetry, while the time position of the respective signal provides information on the measured distance $\Delta z$.

FIG. 5 schematically shows a situation in which not only an object light spot P located in the measuring beam plane (i.e. the plane of symmetry extending normal to the plane of the drawing and containing the measuring beam MB) but also a false reflection R, i.e. a spurious spot located outside this plane of symmetry are projected as image spots onto the two detectors D1 and D2 via the respective reception paths OT1 and OT2. Those portions of the output signals obtained by reading out the two detectors that correspond to image spots $\delta_{P1}$ and $\delta_{P2}$ (the projections of object light spot P) are mutually correlated, whereas the signal portions corresponding to image spots $\delta_{R1}$ and $\delta_{R2}$ (the projections of false reflection R) are not. In other words, the multiplication performed to the two detector output signals applied to the comparator results in the production of a product signal at the output of this comparator, of which product signal the signal portion corresponding to the product of image spots $\delta_{P1}$ and $\delta_{P2}$ is clearly distinct from the remaining portion of this product signal. Consequently, the arrangement in question has a discriminating capacity in respect of false reflections or spurious signals caused by object spots located outside the plane of symmetry.

In accordance with a further aspect of the invention, the embodiment described with reference to FIGS. 4 and 5 may be simplified in the sense that only a single detector is used instead of two separate ones. FIG. 6 schematically shows such a basic embodiment of a measuring system according to the invention employing a single detector. In principle, this embodiment is identical to that shown in FIG. 4. Just like the embodiment of FIG. 4, the embodiment of FIG. 6 includes a first reflected radiation transmission path and a second reflected radiation transmission path so arranged and oriented relative to the measuring beam plane or plane of symmetry that an essentially mirror-symmetrical configuration is formed. In particular, the first and second transmission paths each include an entrance light guide IG1 and IG2, respectively, each having a light reflector surface RV1 and RV2, respectively, operative to receive reflected radiation from the object's surface and to deflect this radiation into the direction of an associated objective lens OL1 and OL2, respectively. The two objective lenses are optically coupled to a beam splitter BS. This beam splitter is composed of two prisms PR1 and PR2 cemented to each other to have one prism face in common. This common prism face is partially reflective to reflected radiation emanating from objective lens OL1 and partially transmissive to reflected radiation emanating from objective lens OL2. The construction is such that both radiation reflected by the common prism face and radiation transmitted by this face are directed to the detector GD common to both reflected radiation transmission paths. If this arrangement is an essentially perfect mirror-symmetrical configuration, reflected radiation from each object spot located in the measuring beam plane or plane of symmetry is imaged via the two transmission paths on the detector as a single spot distinguishing itself by its intensity from any other image spots formed on this detector as a result of false reflections or spurious signals. In principle, in this manner a discriminating capacity is achieved which permits "good" reflections to be distinguished from false reflections or spurious signals. However, such a discriminating capacity may be made more efficient and practical by introducing, in accordance with a further aspect of the invention, a slight asymmetry into the configuration formed by the two reflected radiation transmission paths.

In the embodiment of FIG. 6, such an asymmetry can be obtained by mounting the objective lenses OL1 and OL2 at such a fixed optical distance from the common detector GD that reflected radiation from an object spot located in the plane of symmetry is each time imaged on the detector as two discrete image spots spaced a fixed distance apart. Reflected radiation or spurious radiation originating from a point located outside this plane of symmetry though within the "field angle" of the detector is imaged on this detector as one or more image spots which are not spaced apart by such a fixed distance. In this embodiment, the output signal obtained by reading out the detector has to be multiplied by a predetermined filter function having the form of the detector signal to be expected, i.e. a signal having two signal peaks spaced a fixed distance apart. This can be realized by, for example, applying the output signal of the detector to the input of a shift register having a given number of memory positions, while during the period of time that the read-out detector signal is present in the shift register, an auxiliary signal image is applied to this shift register, so that the signal shifted out of the register is a product signal having a clearly recognizable signal extreme which is indicative of a "good" reflection. In other words, the detector output signal can be optimally filtered by an auto-correlating operation. In fact, to this end the detector signal f(x) is multiplied by the signal f(x+ΔT) for each signal segment, integration of these products resulting in a signal being a function of ΔT. In this manner, false reflections and spurious signals can be distinguished from good reflections as such false reflections are suppressed by this auto-correlating operation.

Under particular circumstances, false reflections of a specific type, namely those causing a detector output signal having two peaks spaced apart by the aforesaid fixed distance, appear to occur, which false reflections are therefore not recognized as such during the discriminating procedure described above and hence result in an erroneous measurement. To solve this problem, in the embodiment of FIG. 6 the two reflector surfaces RV1 and RV2, which extend normal to the plane of the drawing in the situation illustrated in FIG. 6, may be tilted through equal angles. Seen in FIG. 6, the axes about which the reflector surfaces are to be tilted are the intersecting lines of the respective reflector surfaces and the plane of the drawing. Such a tilted mounting of the reflector surfaces actually results in the definition of a straight line extending into space, in particular a straight line extending in the measuring beam plane and enclosing an acute angle with the plane of the drawing. Only radiation reflected along such a straight line can reach the detector via the two transmission paths. Consequently, by such a tilted mounting of the two reflectors it is achieved that the area from which reflected radiation can impinge upon the detector via the two transmission paths is greatly reduced. Self-evidently, in this modification the measuring beam is directed along the aforesaid straight line.

The embodiment described with reference to FIG. 6 entails the practical drawback that, when components IG1, IG2, OL1, OL2 and BS are united into a single unit, a relatively voluminous assembly is obtained. This is due to the fact that the use of the triangulation principle required a certain minimum angle at which the object's surface is viewed and hence a certain minimum width of the triangle's base as defined by the two entrance light guides. Moreover, the embodiment of FIG. 6 requires the presence of an objective lens in each reflected-radiation transmission path.

FIG. 7 schematically shows a preferred embodiment of the invention lacking the above-mentioned drawbacks inherent in the embodiment of FIG. 6. The operation of this preferred embodiment is equivalent to that of the embodiment of FIG. 6. Reflected radiation schematically indicated by R and T as originating from each object spot located in the measuring beam plane emanates at a fixed aperture angle 2δ from the composite prism uniting the functions of the components shown in FIG. 6, apart from the detector and the two objective lenses. By the choice of the single objective lens and its distance to the detector, it can be achieved that each pair of beams of reflected radiation associated with an object spot located in the measuring beam plane and emanating from the composite prism, is projected onto the detector surface as two image spots spaced a fixed distance apart. In this embodiment, the angle indicated by A is equal to 45°+δ, while the angle indicated by A is equal to 45°−δ.

In the embodiments described above with reference to FIGS. 6 and 7, use is made of a "space division principle" to distinguish between good and false reflections. It is also possible, however, to use a "time division principle" for the same purpose. In the embodiments of FIGS. 6 and 7, this would require the use of a pair of optical switches mounted in the optical transmission paths between the entrance light guides and the object's surface. These optical switches are operated in counterphase, so that when one optical switch passes radiation the other optical switch blocks radiation. In this manner, the reflected radiation directed via the two transmission channels to the detector is presented at this detector in the form of a time-divided optical signal having time slots for a first time channel corresponding to one transmission path and time slots for a second time channel corresponding to the other transmission path. The two time channels are alternately applied to the detector, so that a single detector output signal will contain time-separated information of the two transmission paths. The signal processor connected to the detector output includes a demodulator operative to form two spatially separated electrical signals from the singular electrical signal applied thereto, one of these two electrical signals corresponding to one transmission path and the other electrical signal corresponding to the other transmission path. These two spatially separated electrical signals can be compared to each other by means of a comparator so as to distinguish good reflections from false reflections.

In an alternative embodiment of a measuring system according to the invention use may be made of a measuring beam having a predetermined, specific characteristic introduced therein, in combination with a waveform-sensitive filter, such as a so-called matched filter, as a component of the means for processing and filtering, respectively, the detector output signals. Normally, the intensity distribution of the measuring beam can be characterized by a Gaussian curve. An asymmetric intensity distribution having a desired distribution curve can be obtained by, for example, mounting an appropriate mask in the optical path of the measuring beam. The matched filter is so dimensioned that its pass-waveform corresponds to the signal waveform to be expected when an object spot formed by such an "asymmetric" measuring beam is imaged on the detector. In particular, an object spot located in the plane of symmetry, i.e. an object spot representative of a good reflection, will result in a detector spot and hence a detector output signal having a significant asymmetric peak shape. Object spots located outside the plane of symmetry (the measuring beam plane) result in reflected radiation which, when imaged on the detector, causes signal waveforms at the detector output that fail to correspond to the pass-characteristic of the matched filter. As, generally speaking, a false reflection implies a twofold reflection of the measuring beam from the object's surface, such a false reflection will result in a detector spot and hence a detector output signal having a peak shape that is the mirror image of the peak shape associated with a good reflection. Consequently, the asymmetric intensity distribution of the measuring beam provides a clear criterion on the basis whereof it can be ascertained with simple means whether a detector output signal is representative of a good or a false reflection. Thus such false reflections can efficiently be distinguished from good reflections.

Although a number of specific embodiments are described in the above, it will be clear that the average worker in the art is able to come up with numerous modifications or different embodiments without exceeding the scope of the invention as described in this specification and the accompanying claims. Self-evidently, the provisions made in the transmission section and the reception section in order to render the measuring system suitable for the measurement of a surface profile or surface contour of an object, as described above, may readily be applied to the embodiments discussed with reference to FIGS. 4–7.

What we claim is:

1. A measuring system for determining the distance between a reference level and a spot on the surface area of an object when said spot is within a measuring range extending from said reference level, by utilizing principle of triangulation, said system comprising: light source means for producing measuring radiation; optical collecting means optically coupled to said light source means for producing a beam of measuring radiation extending through said measuring range and towards an object spot under examination, reflected light image receiving means for receiving light radiation reflected from an object surface spot irradiated by said beam, and including receiving lens means for collecting radiation reflected from said object surface spot, and a radiation-sensitive detector optically coupled to said receiving lens means for receiving light radiation collected thereby and for converting the light radiation thus received into a corresponding signal; said detector having a substantially linear radiation-sensitive area; said receiving lens means being dimensioned and disposed relative to said beam and said detector as to image only those object surface spots irradiated by said beam within said measuring range, onto said linear radiation-sensitive area of said detector as focussed spots; said optical collecting means optically coupled to said light source means including further lens means adapted to cause the cross-sectional area of said beam to gradually increase from said reference level and with increasing distance therefrom, thereby causing said focussed spots on said detector to be of substantially one and same size.

2. The measuring system according to claim 1 wherein said light source means is adapted to emit monochromatic radiation having a selected wavelength within a wavelength range of wavelength components which are substantially spaced from wavelength components corresponding to spurious background radiation to be expected; and wherein an optical bandpath filter is disposed within the spatial viewing angle of said detector, said bandpass filter being dimensioned to have a wavelength of the pass-band thereof, preferably the medium wavelength thereof, to correspond to said selected wavelength.

3. The measuring system according to claim 1 wherein masking means are disposed in the optical path of said beam of measuring radiation for distorting said beam whereby a respective object surface area is irradiated with a measuring beam of asymmetric intensity distribution; and said reflected light image receiving means includes a signal processor adapted to exclusively pass those signal portions of a detector output signal applied thereto that correspond to image dots being a projection on said detector of the object spot irradiated by said measuring beam and having an asymmetric intensity distribution as determined by said measuring beam.

4. A measuring system for determining the distance between a reference level and a spot on the surface area of an object when said spot is within a measuring range extending from said reference level, by utilizing principle of triangulation, said system comprising: light source means for producing measuring radiation; optical collecting means optically coupled to said light source means for producing a beam of measuring radiation extending through said measuring range and towards an object spot under examination; first reflected light image receiving means for receiving light radiation reflected from an object surface spot irradiated by said beam, and including first receiving lens means for collecting radiation reflected from said object surface spot; second reflected light image receiving means for receiving light radiation reflected from said object surface spot irradiated by said beam and including second receiving lens means for collecting radiation reflected from said object surface spot; a common radiation-sensitive detector optically coupled to said first and second receiving lens means for receiving light radiation collected whereby and for converting the light radiation thus received into corresponding signals, said detector having a substantially linear radiation-sensitive area; said first receiving lens means and said second receiving lens means being dimensioned and disposed relative to said beam and to said common detector as to image only any object surface spot irradiated by said beam within said measuring range, onto said linear radiation-sensitive area of said common detector as two focussed dots spaced a fixed distance from each other; and signal processing means coupled to said common detector for performing an auto-correlation function in respect of the detector output signal containing two discrete signal components spaced apart an interval corresponding to said fixed distance.

5. A measuring system for determining the distance between a reference level and a spot on the surface area of an object when said spot is within a measuring range extending from said reference level, by utilizing principle of triangulation, said system comprising: light source means for producing measuring radiation; optical collecting means optically coupled to said light source means for producing a beam of measuring radiation extending through said measuring range and towards an object spot under examination; first reflected light image receiving means for receiving light radiation reflected from an object surface spot irradiated by said beam, and including first receiving lens means for collecting radiation reflected from said object surface spot; second reflected light image receiving means for receiving light radiation reflected from said object surface spot irradiated by said beam, and including second receiving lens means for collecting radiation reflected from said object surface spot; two prisms seucred to each other to have one prism surface in common, said two prisms having one surface optically coupled to said first receiving lens means and having another surface optically coupled to said second receiving lens means thereby causing radiation received from said first receiving lens means to pass through said common prism surface in partially undiffracted fashion and radiation received from said second receiving lens means to be partially reflected by said prism surface in common; a common radiation-sensitive detector optically coupled to said prism surface in common for receiving said light radiatioan passed therethrough and light radiation partially reflected thereby, and for converting the light radiation thus received into corresponding signals, said detector having a substantially linear radiation-sensitive area; said first receiving lens means and said second receiving lens means being dimensioned and disposed relative to said beam and said detector as to image only any object surface spot irradiated by said beam within said measuring range, onto said linear radiation-sensitive area of said common detector as two focussed dots spaced a fixed distance from each other; and signal processing means coupled to said common detector to perform an auto-correlation function in respect of the detector output signal containing two discrete signal components spaced apart an interval corresopnding to said fixed distance.

6. The measuring system according to claim 5 wherein said first reflected light image receiving means further includes a first reflector surface adapted to direct light radiation reflected from said object surface spot onto said prism surface in common; said second reflected light image receiving means further including a second reflector surface operated to direct light radiation reflected from said object surface spot irradiated by said beam and to said prism surface in common; said first reflector surface and said second reflector surface each is tilted through one and same angle about a respective one of two intersecting axes extending mirror-symmetrically relative to a plane extending through said beam; said beam being directed along the line of intersection of two planes through which any object spot produced by said beam is imaged on said common detector.

7. The measuring system according to claim 5 wherein said prism surface in common is tilted relative to a plane extending through said beam, the tilting angle being determinative of said fixed distance.

8. The measuring system according to claim 6 wherein each one of said first and second reflected light image receiving means includes a reflector surface disposed to direct radiation reflected from one and same object surface spot irradiated by said beam, onto said prism surface in common; each of said reflector surfaces together with said prism surface in common forming one of said two prisms.

* * * * *